(12) United States Patent  
Kanninen (10) Patent No.: US 7,732,964 B2  
(45) Date of Patent: Jun. 8, 2010

(54) PERMANENT MAGNET UNIT FOR AN ELECTRICAL MACHINE, A METHOD OF INSTALLING PERMANENT MAGNET UNITS AND A ROTOR OF AN ELECTRICAL MACHINE

(75) Inventor: Pekka Kanninen, Espoo (FI)

(73) Assignee: ABB Oy, Helsinki (FI)

( * ) Notice: Subject to any disclaimer, the term of this patent is extended or adjusted under 35 U.S.C. 154(b) by 0 days.

(21) Appl. No.: 12/331,704

(22) Filed: Dec. 10, 2008

(65) Prior Publication Data

US 2009/0146520 A1      Jun. 11, 2009

(30) Foreign Application Priority Data

Dec. 11, 2007   (FI) ................................. 20070963

(51) Int. Cl.
*H02K 21/12*      (2006.01)

(52) U.S. Cl. .................. 310/156.28; 310/156.53

(58) Field of Classification Search ............ 310/156.12, 310/156.23, 156.26, 156.28, 156.29, 156.33, 310/156.53, 156.56, 156.72, 154.03, 154.11–154.13
See application file for complete search history.

(56) References Cited

U.S. PATENT DOCUMENTS

| | | | | |
|---|---|---|---|---|
| 4,144,469 A | * | 3/1979 | Miyashita et al. ...... | 310/156.28 |
| 4,371,799 A | * | 2/1983 | De Wolf et al. ........ | 310/154.11 |
| 4,792,712 A | * | 12/1988 | Stokes ................... | 310/156.21 |
| 5,117,553 A | * | 6/1992 | Kliman ........................ | 29/598 |
| 6,002,194 A | * | 12/1999 | Asao .......................... | 310/263 |
| 6,013,968 A | * | 1/2000 | Lechner et al. ............. | 310/263 |
| 6,677,692 B1 | * | 1/2004 | Sato et al. ...................... | 310/89 |
| 6,853,112 B2 | * | 2/2005 | Nakamura et al. .......... | 310/263 |
| 7,405,503 B2 | * | 7/2008 | Aoyama ................ | 310/156.53 |
| 2006/0186752 A1 | * | 8/2006 | Matsumoto et al. ..... | 310/156.53 |
| 2007/0205686 A1 | | 9/2007 | Ishida | |
| 2009/0079287 A1 | * | 3/2009 | Hattori et al. .......... | 310/156.53 |

FOREIGN PATENT DOCUMENTS

| | | |
|---|---|---|
| JP | 2001-016808 A | 1/2001 |
| WO | 2007/105811 A1 | 9/2007 |
| WO | WO 2007/116118 A1 | 10/2007 |

OTHER PUBLICATIONS

Finnish Search report for FI20070963 completed Apr. 2, 2008 (in Finnish).
ABB Brochure; "MLK Low Voltage Switchboard System", ABB Oy, Finland, Dec. 10, 2008.
European Search Report issued in European Patent Application No. EP 08 17 0199 dated Jun. 17, 2009.

* cited by examiner

*Primary Examiner*—Dang D Le
(74) *Attorney, Agent, or Firm*—Buchanan Ingersoll & Rooney PC (57) ABSTRACT

A permanent magnet unit is provided for an electrical machine. The electrical machine includes a stator and rotor. At least one permanent magnet is enclosed in a non-magnetic enclosure. The enclosure has means for connecting it to at least one other substantially similar enclosure containing a permanent magnet.

20 Claims, 5 Drawing Sheets

PERMANENT MAGNET UNIT FOR AN ELECTRICAL MACHINE, A METHOD OF INSTALLING PERMANENT MAGNET UNITS AND A ROTOR OF AN ELECTRICAL MACHINE

SCOPE OF THE INVENTION

The object of the invention is a permanent magnet unit for an electrical machine, a method for installing magnet units to an electrical machine, and a rotor for an electrical machine, which is excited by permanent magnet units.

PRIOR ART

A permanent magnet is a component manufactured from a magnetically hard material and able to retain its magnetism permanently after magnetization. Permanent magnets are manufactured, for example, from an AlNiCo mixture that includes aluminum, nickel, cobalt and steel, or from ceramic materials or rare earth metals.

The industrial applications of permanent magnet motors have increased rapidly, particularly in the over-500 kW range. Permanent magnet motors have high efficiency, power density and reliability. Unlike a squirrel cage motor, for example, the properties of permanent magnet motors do not deteriorate when the rotation speed is low. Therefore, permanent magnet motors are well suited for the gearless drives used in, for example, windmills, electric trains and paper machines.

Rotating electrical machines have high rotating speeds, which results in major centrifugal forces affecting the rotor and the permanent magnets attached to the rotor. This sets requirements for precision of installation of the permanent magnets, and the durability of the fastenings and locking of the magnets.

The axial positioning of the magnets is also important, for example for rotors with a radial cooling system. In such systems, coolant flows into the rotor along axial channels and is then distributed into radial channels inside the rotor. If permanent magnets are not correctly positioned and reliably fastened, they may block a radial coolant channel and lead to an unwanted temperature increase inside the rotor.

A traditional way of fixing the permanent magnets to a rotor is to wrap the magnets individually in felt and then install them into the rotor, after which the rotor is immersed in resin. Another way of fastening the permanent magnets to the outer circumference of the rotor is to wrap resinified fiberglass tape around the rotor and permanent magnets. The resin used as a fixing agent is hardened by heating the rotor and permanent magnets in an oven.

The oven treatment required to harden the resin constitutes a problem for these traditional fastening methods. The oven temperature must be monitored so that it does not rise above the maximum temperature allowed for permanent magnets. During resinification it must also be ensured that the correct amount of resin is used at all necessary locations to ensure the permanence of the fastening of the permanent magnets.

Structural fragility and the sensitivity of any surface treatment add to the difficulties encountered during the handling and installation of permanent magnets. For example, the surface treatment of a permanent magnet is easily scratched, after which the magnet may begin to crumble or corrode.

SUMMARY

The purpose of the present invention is to create a permanent magnet unit for an electrical machine, a method to install permanent magnet units in an electrical machine, and an electrical machine rotor which is excited by permanent magnet units.

In a permanent magnet unit according to the invention, designed for an electrical machine comprising a stator and rotor, at least one permanent magnet is enclosed in a non-magnetic enclosure. The enclosure has means for connecting it to at least one other substantially similar enclosure containing a permanent magnet.

In a method according to the invention to install permanent magnet units in an electrical machine, the electrical machine comprises a stator and a rotor. The rotor rotates around its shaft. The method involves at least two permanent magnet units to be installed, each of which comprising at least one permanent magnet enclosed in a non-magnetic enclosure. The enclosed permanent magnet is magnetized, and the enclosure has means for connecting it to at least one other substantially similar enclosure containing a permanent magnet. In the method, the first permanent magnet unit is installed from the rotor end into an installation channel parallel to the rotor axis, and the second permanent magnet unit is installed into the installation channel after the first permanent magnet unit in the direction of the rotor axis. The second permanent magnet unit is pushed against the first permanent magnet unit, and the permanent magnet units engage with each other using the brackets on the enclosures.

The rotor of the electrical machine according to the invention is excited with permanent magnets. The rotor rotates around its rotation axis and comprises at least a frame and permanent magnets. At least one permanent magnet is enclosed in a non-magnetic enclosure, and the enclosed permanent magnet is magnetized. The enclosure has means for connecting it to at least one other substantially similar enclosure containing a permanent magnet, the other enclosed permanent magnet constituting a permanent magnet unit. At least two permanent magnet units are placed inside an installation channel formed inside the rotor frame one after another in the direction of the rotor axis and the permanent magnet units are connected to each other. At the ends of the installation channel, there are supports that prevent the permanent magnets from moving in the direction of the rotor axis.

The enclosure protects the permanent magnet during handling and installation, helping to avoid scratching and damaging of the permanent magnet's surface, for example. If the enclosure of the permanent magnet unit is fully closed, such as an insert molded enclosure, raw, i.e. not surface-treated, magnets may be used as permanent magnets. However, commercial permanent magnets are usually phosphated as a basic surface treatment. A hermetically sealed, airtight enclosure, manufactured from non-breathing plastic that will not absorb water, for example, will protect the permanent magnet in difficult conditions.

Enclosed permanent magnets are easier to manufacture than unenclosed magnets, as defects of form are allowed for an enclosed magnet. Traditionally, permanent magnets are manufactured by sintering and then honed to precise dimensions. Typical dimensional accuracy is in decimals of a millimeter. When the permanent magnet is enclosed, ±0.1...0.5 mm is an adequate dimensional accuracy. When manufacturing the enclosure with the insert molding method, in which an insert consisting of one or more permanent magnets is placed inside the plastic mold before casting and the plastic encases the insert, even more dimensional inaccuracy is allowed, as plastic will fill any gaps.

A permanent magnet unit consisting of, for example, one permanent magnet is easier to manufacture and handle than a single large permanent magnet. The equipment needed to magnetize a permanent magnet in a permanent magnet unit, for example, is considerably simpler and available to a larger group of manufacturers than the equipment needed to magnetize a permanent magnet which is, for example, three times as large. According to an embodiment of the invention, the permanent magnet is magnetized when enclosed, which increases safety at work at the manufacturing stage.

According to an embodiment of the invention, the permanent magnet unit has a feature that helps find the correct orientation when installing the unit into the rotor. Permanent magnets are magnetized, for example, in the direction of the rotor radius. A ridge or bevel can be formed, for example on the top or bottom surface of the permanent magnet unit's enclosure. When the permanent magnet unit is installed, the ridge or bevel will collapse and lock the unit in place. Another option is to add a color mark to the permanent magnet unit's enclosure, indicating the polarity.

No resinification or oven treatment is necessary to fix the permanent magnets in place in the method for installing permanent magnet units in an electrical machine. The installation of the permanent magnets can be carried out at factory temperature. The positioning of the permanent magnets is easy, as the shape of the permanent magnet unit corresponds to the shape of the installation channel. The location of the permanent magnet in the installation channel will be correct, as the permanent magnet units are located within a fixed distance of each other.

The permanent magnet units installed in the installation channel inside the rotor are embedded in the rotor and have a good tolerance for centrifugal forces when the rotor rotates, for example, at more than 2,000 rpm.

The solution according to the invention is also advantageous in situations in which the permanent magnets are demagnetized in the rotor of an electrical machine. The solution according to the invention facilitates easy replacement of permanent magnets in the rotor. Permanent magnet units are installed through an opening at the rotor end one after another in an axial direction into a channel or rotor groove within the rotor, parallel to the axis of the rotor. Permanent magnet units can be removed from the rotor by removing the support or lock preventing their axial movement at the other end of the rotor and pushing the permanent magnet unit in the opening at the other end of the rotor, making the interconnected permanent magnet units slide in the channel through the rotor to the other end, where they can be pulled out.

Alternatively, the axial-direction lock can be opened at one end of the installation channel, and the permanent magnet units can then be pulled out from that end of the rotor. The interconnected permanent magnet units form a chain, enabling the removal of all permanent magnet units from the rotor by pulling from the first permanent magnet unit in the chain. Permanent magnet units can be detached from each other by opening the clamps one at a time.

With the solution according to the invention, possible permanent magnet installation errors can be efficiently found and fixed. When incorrect orientation of the permanent magnet unit installed in the rotor is suspected, this can be checked without damaging the rotor by sliding the permanent magnet units out from the rotor.

The solution according to the invention is also advantageous for eliminating the power decrease due to aging of the permanent magnets. The solution according to the invention facilitates easier replacement of permanent magnets within the rotor, making it possible to replace old permanent magnet units, for example in connection with maintenance work.

If electrical magnets were fixed in place with resin, the rotor would have to be heated in an oven in a temperature of over 300° C. to remove the magnets from the rotor. This would destroy all permanent magnets in the rotor and they would need to be replaced.

When the solution according to the invention is used, not all the rotor's permanent magnets need to be replaced. Instead, only the desired number of permanent magnet units will be replaced. Replacement of permanent magnet units can be carried out at factory temperature without oven treatment. The rotor does not need to be transported long distances to be repaired. Instead, local repair facilities can be used.

A preferred embodiment of the invention is a rotor with a radial cooling system. The coolant flows into the rotor along axial channels and is then distributed into radial channels inside the rotor. Depending on the cooling solution, cooling air is conducted into the rotor from one or both ends of the rotor. In the radial channels, cooling air flows toward the rotor circumference and further toward the electrical machine's air gap. Rotor core sections consist of thin packed sheets and radial channels are formed between the rotor core sections by separating the core sections with spacers in the axial direction. In a rotor with a radial cooling system, permanent magnet units are installed in the installation channel so that the end of the permanent magnet unit is flush against the rotor end plate at the other end of the rotor. When the distance between two permanent magnet units connected to each other is substantially the same as the width of a radial cooling channel of the rotor, the permanent magnet unit is placed at the rotor core and the connection brackets of the permanent magnet unit are placed at the radial ducts. The opening through which the permanent magnet units were inserted are closed, or the other end plate of the rotor is fixed in place to cover the opening and to lock the permanent magnet units in place in the axial direction.

If the pole of the electrical machine is wide, its mechanical strength can be increased by dividing it into several sections. According to a preferred embodiment, at least two installation channels exist in the pole of the electrical machine in this case.

The arrangement according to the invention is preferable, for example, for wind generators, which typically operate in difficult weather conditions and a corrosive atmosphere. The required rotation speed range of wind power generators is large. Gusty winds may increase the wind velocity quickly, resulting in a rapid increase in the effect of centrifugal force on the rotor and the permanent magnets attached to it. When the load leaves the network, the rotation speed of the rotor may quickly rise to 75-100% of the nominal speed.

FIGURES

In the following, the invention will be described in more detail with the help of certain embodiments by referring to the enclosed drawings, where.

DETAILED DESCRIPTION

Figure 1:
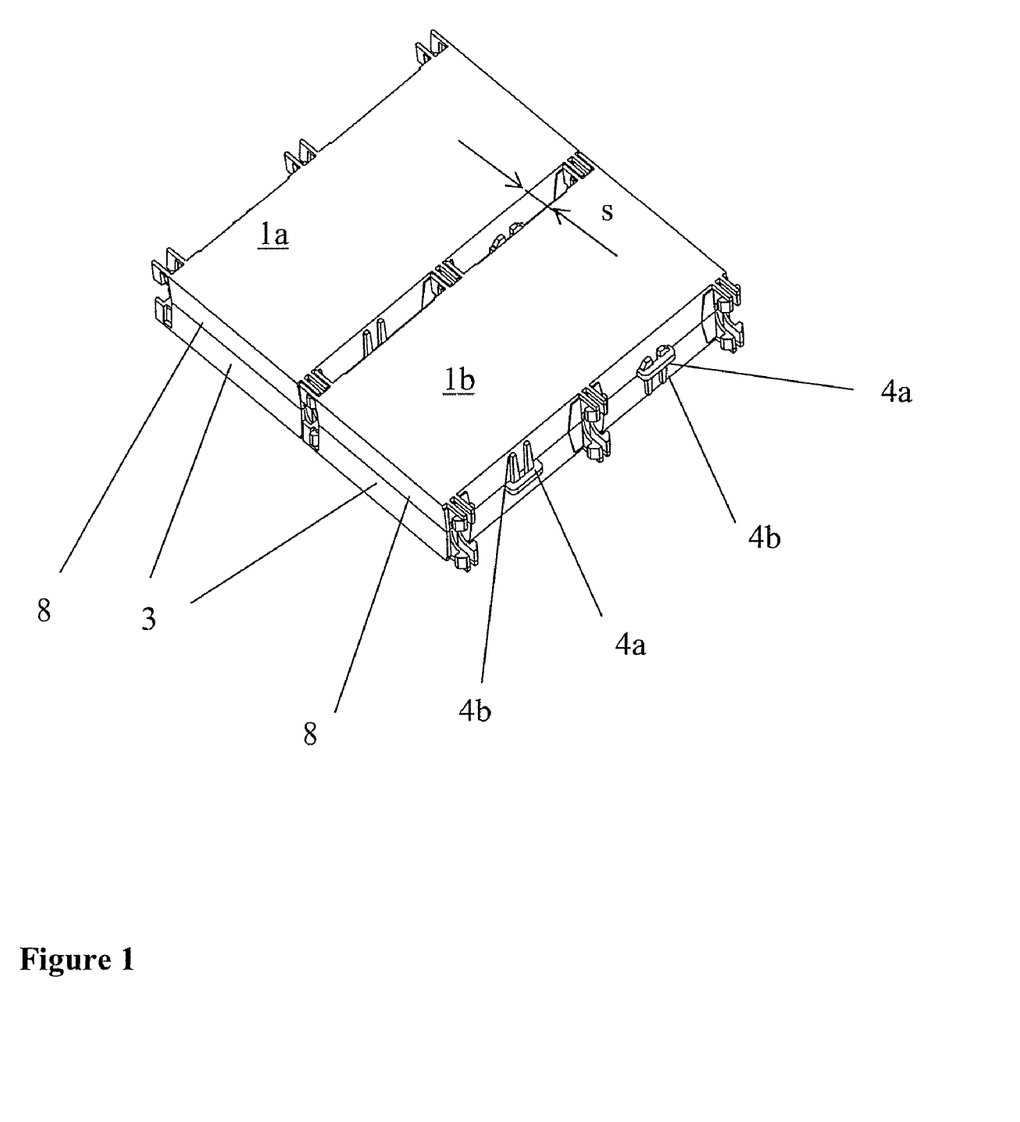
FIG. 1 illustrates two interconnected permanent magnet units.

FIG. 1 illustrates two permanent magnet units 1a and b for an electrical machine. The plastic enclosure 3 consists of two components 3a-c, the top and bottom parts, both manufactured with the same mold, FIGS. 1-3. Symmetrical enclosure components are advantageous in terms of manufacturing techniques, as different tools for different parts are not required. A phosphated permanent magnet 2 has been enclosed by installing it into the bottom part 3c of a two-part plastic enclosure 3, FIG. 2, and then installing the top part of the plastic enclosure. Enclosure components 3a-c have brackets (4a and 4b) to connect the top and bottom components to each other after the permanent magnet (2) has been installed. The mating surface 8 of the top and bottom components of the enclosure is sealed, for example with glue or a sealing agent, to create a completely sealed enclosure.

Figure 2:
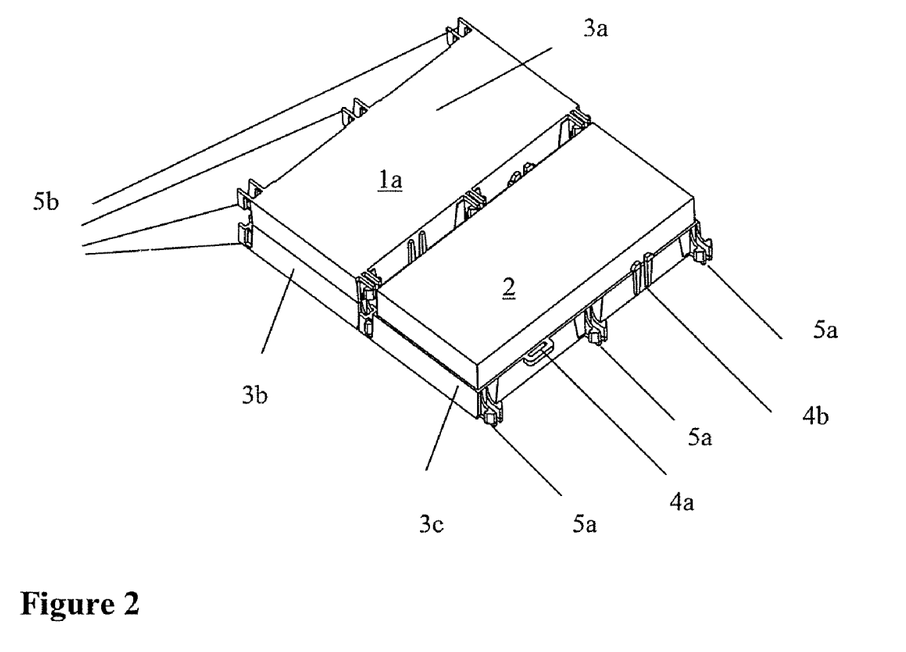
FIG. 2 illustrates two interconnected permanent magnet units, one of which is shown without the top part of the enclosure.
Figure 3:
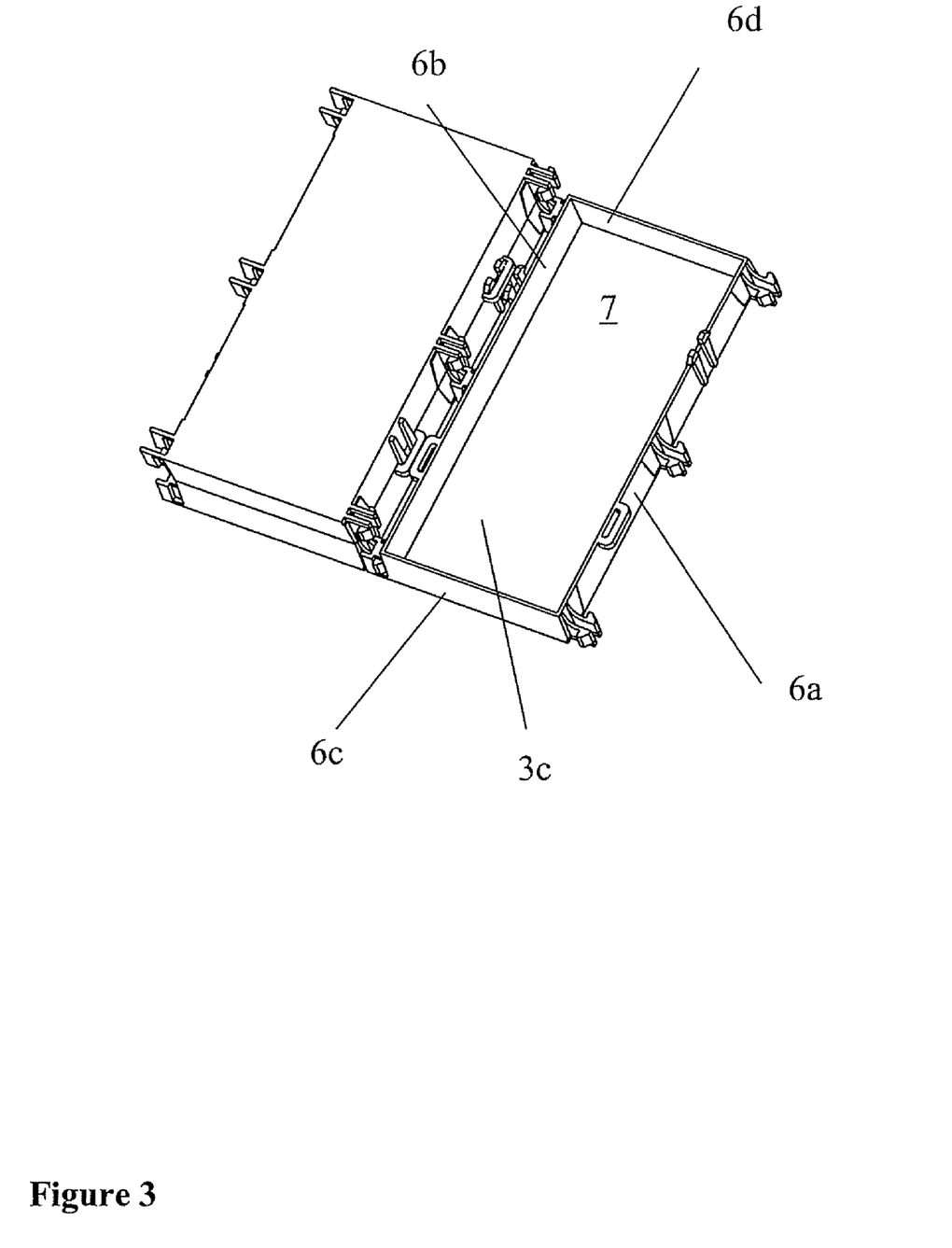
FIG. 3 illustrates a permanent magnet unit with the bottom part of the enclosure of another permanent magnet unit connected to it.

The permanent magnet 2 does not need to be glued to the plastic enclosure 3, as the back 7 and sides 6a-d of the enclosure have been dimensioned to correspond to the back and sides of the permanent magnet. The surface area and shape of the back 7 of the enclosure 3 substantially correspond to the surface area and shape of the back of the permanent magnet 2. The enclosure 3 supports the permanent magnet 2 rendering it immobile in the lateral, axial and vertical directions. As the enclosure 3 must have some free play, the inner surface of the enclosure 3 may have various guides, such as ridges or bevels that will give when installing the permanent magnet and then lock the permanent magnet in place in the enclosure.

Enclosure components 3a-c have brackets 5a, b on the outer surfaces, fastening permanent magnet units to each other. Three pairs of brackets 5a, b have been placed on both long sides 6a, b of the rectangular permanent magnet unit in FIGS. 1-3. Fastening of the permanent magnet units to each other at the minimum of two points is preferred, in order to make them more robust. The permanent magnet units 1a, b are locked together by brackets 5a, b at the ends and the middle of the long sides. The brackets 5a, b engage and lock when the two permanent magnet units 1a, b are pushed together. When the permanent magnet unit 1a, b has been installed into the rotor, the brackets 5a, b are located in the permanent magnet unit sides that are transverse to the axial direction of the rotor.

Permanent magnet units can be fastened together with brackets inside the rotor installation channel or, if desired, before the permanent magnet units are installed into the rotor.

At the outmost permanent magnet unit end in the axial direction of the rotor, the ends of the brackets 5a, b define the distance from the rotor end plate and act as support elements in the axial direction of the rotor.

The permanent magnet unit enclosure can also be manufactured using the insert molding method. For example, two or three permanent magnets are placed inside the mold, and the plastic constituting the enclosure is then cast so that it adheres to the magnets. The enclosure will be completely sealed, and no connection brackets or sealing at the mating surfaces of components are required.

If the rotor is a closed rotor, where the thin sheets in the rotor core are flush with each other, it is preferred that the fixed distance between two permanent magnet units fastened together is kept short. In this case, the brackets of the permanent magnet unit are placed on the permanent magnet unit sides parallel to the rotor axis. When the permanent magnet units are then connected together, only the distance created by the enclosure walls remains between the permanent magnets, and the adjacent sides of permanent magnet units are flush with each other.

Brackets can also be placed, for example, on the permanent magnet unit sides that are transverse to the axial direction of the rotor, so that when two permanent magnet units are connected together, the brackets of the first permanent magnet unit penetrate inside the second permanent magnet unit. The adjacent sides of the permanent magnet units will then be flush with each other. The space required by the penetrating brackets of the second permanent magnet unit can be created on the permanent magnet unit sides parallel to the rotor axis, for example, by making the sides thicker.

When using permanent magnet units to excite a rotor with a radial cooling system, the distance between two permanent magnet units 1a, 1b is dimensioned to be substantially equal to the width of a radial cooling duct of the rotor. This ensures that the permanent magnet unit will not block the coolant flow in the rotor air duct, as only the permanent magnet unit brackets will be located at the air duct.

Figure 4:
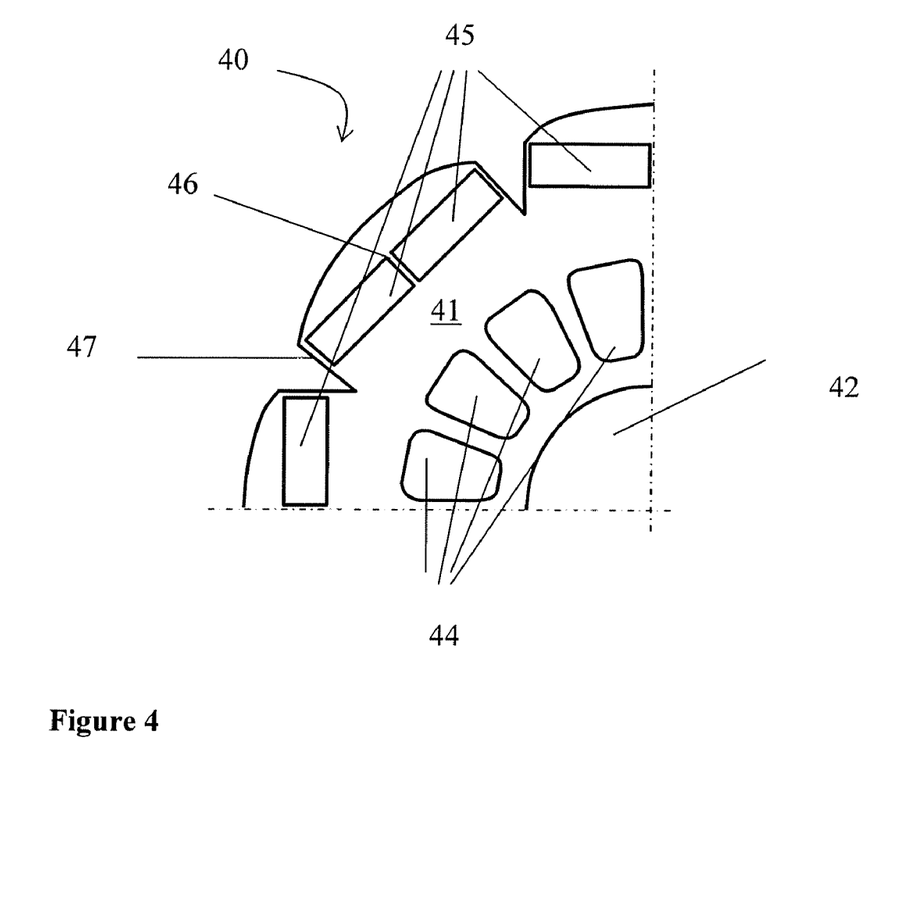
FIG. 4 illustrates a partial cross-section in the axial direction of a rotor according to the invention.
Figure 5:
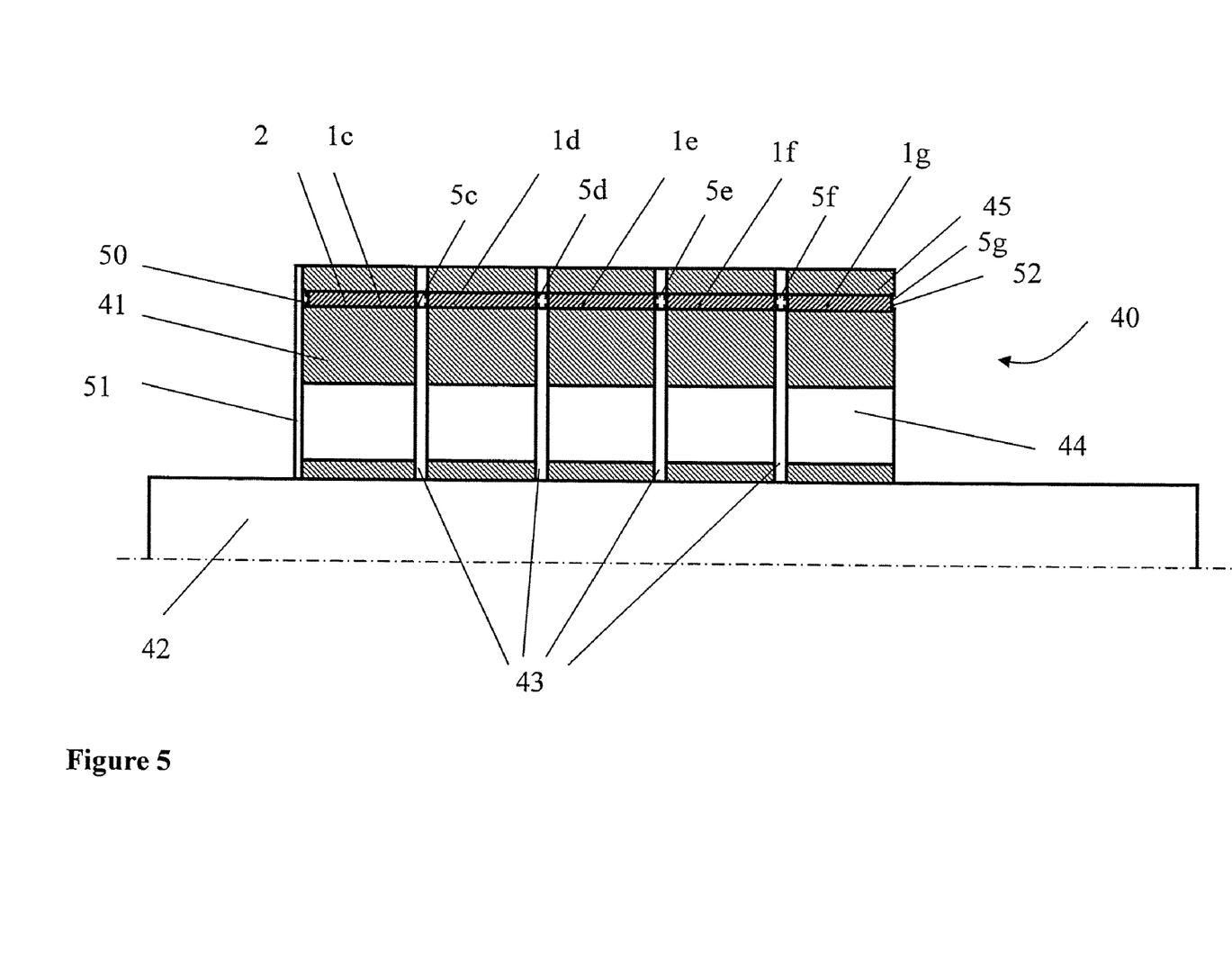
FIG. 5 illustrates a cross-section A-A perpendicular to the shaft from FIG. 4.

FIG. 4 is a partial cross-section of the rotor (40) of an eight-pole synchronous machine according to the invention. FIG. 5 is the cross-section A-A from FIG. 4. The rotor core (41) fitted on a shaft (42) is manufactured from magnetically conductive sheets. The rotor consists of four core sections in the axial direction, separated by radial air duct 43 between the sheets. The coolant air cooling the rotor flows through the air duct in the radial direction towards the outer circumference of the rotor in a well-known way. The rotor core has channels 44 parallel to the rotor axis to lighten the structure and to allow the coolant air to flow through the rotor. Rotor poles with two permanent magnet unit chains embedded inside the core have been formed at the outer circumference of the rotor. The permanent magnet units have been fitted inside the installation channels 45 extending throughout the rotor's length parallel to the longitudinal axis of the rotor. The permanent magnet units 1c-g comply with the illustrations in FIGS. 1-3. In the circumferential direction of the rotor, the permanent magnet units are separated by a narrow core strip 46. Similarly, there is a core strip 47 between both permanent magnet units and the pole edge. The core strips 46, 47 support the outmost part of the rotor pole and the permanent magnet units against centrifugal forces.

Permanent magnet units 1c-g are installed in place by pushing them into the openings 52 at the end of the rotor 40. The end 50 of the permanent magnet unit 1c is flush against the rotor end plate 51 at the other end of the rotor. As a result, the permanent magnet 2 inside the permanent magnet unit is located at the rotor core 41. The brackets 5c-f in the chain consisting of permanent magnet units 1c-g are located at the radial ducts 43. The brackets 5g of permanent magnet unit 1g closest to the installation opening 52 are flush against the end plate. The permanent magnet unit installation opening 52 will be closed, or the other end plate of the rotor will be fixed in place to cover the opening and to lock the permanent magnet units in place in the axial direction. It is not necessary to fasten the permanent magnet units to the rotor, as the installation channel and the end plates will lock them in place in relation to the rotor.

The figures illustrate an substantially rectangular, flat permanent magnet unit. The permanent magnet unit may also be a non-right-angled parallelogram.

The permanent magnet unit may also be outwardly arched to follow the curve of the rotor circumference. In this case, the top and bottom components of the permanent magnet unit will not have the same shape.

The invention has been described above with the help of certain embodiments. However, the description should not be considered as limiting the scope of patent protection; the embodiments of the invention may vary within the scope of the following claims.

Parts List:

1a-g permanent magnet unit; 2 permanent magnet; 3 enclosure; 3a, b top component of the enclosure; 3c bottom component of the enclosure; 4a, b closing bracket; 5a-g connection bracket; 6a-d side of the enclosure; 7 back of the enclosure; 8 mating surface; 40 rotor; 41 rotor core; 42 shaft; 43 air duct; 44 opening; 45 installation channel; 46, 47 core strip; 50 end of the permanent magnet unit; 51 end plate; 52 opening; s distance.

The invention claimed is:

1. A permanent magnet unit for an electrical machine, said electrical machine comprising a stator and a rotor, wherein said permanent magnet unit comprises:
an enclosure including a first enclosure which contains at least one first permanent magnet enclosed therein, a substantially similar second enclosure which contains at least one second permanent magnet enclosed therein, and a connection mechanism configured to connect the first enclosure enclosing the at least one first permanent magnet therein to the second enclosure enclosing the at least one second permanent magnet therein.

2. A permanent magnet unit according to claim 1, wherein the at least one first permanent magnet is magnetized while enclosed in the first enclosure.

3. A permanent magnet unit according to claim 2, wherein the at least one second permanent magnet is magnetized while enclosed in the second enclosure.

4. A permanent magnet unit according to claim 1, wherein at least one of the first enclosure and the second enclosure is completely closed.

5. A permanent magnet unit according to claim 1, wherein at least one of the first enclosure and the second enclosure is hermetically sealed with the at least one first permanent magnet and the at least one second permanent magnet enclosed therein, respectively.

6. A permanent magnet unit according to claim 1, wherein the at least one first permanent magnet is enclosed in the first enclosure according to an insert molding method.

7. A permanent magnet unit according to claim 1, wherein the at least one second permanent magnet is magnetized while enclosed in the second enclosure.

8. A permanent magnet unit according to claim 1, wherein the at least one second permanent magnet is enclosed in the second enclosure according to an insert molding method.

9. A permanent magnet unit according to claim 1, wherein:
the first enclosure includes a first upper surface, a first lower surface opposite to the first upper surface, and at least one first bracket configured to connect the first upper surface to the first lower surface to enclose the at least one first permanent magnet in the first enclosure; and
the second enclosure includes a second upper surface, a second lower surface opposite to the second upper surface, and at least one second bracket configured to connect the second upper surface to the second lower surface to enclose the at least one second permanent magnet in the second enclosure.

10. A permanent magnet unit according to claim 1, wherein the connection mechanism comprises at least one bracket configured to connect the first enclosure to the second enclosure.

11. A permanent magnet unit according to claim 1, wherein the connection mechanism comprises at least one magnet configured to connect the first enclosure to the second enclosure.

12. A permanent magnet unit according to claim 1, wherein the connection mechanism comprises a first bracket arranged on a first outer surface of the first enclosure and a second bracket arranged on a second outer surface of the second enclosure that is adjacent to the first outer surface of the first enclosure, the first and second brackets of the connection mechanism being configured to be connected together to connect the first enclosure to the second enclosure.

13. A permanent magnet unit according to claim 1, wherein the connection mechanism comprises a hermetic sealing of the first enclosure to the second enclosure.

14. A permanent magnet unit according to claim 1, wherein a first outer surface of the first enclosure connected by the connection mechanism to a second outer surface of the second enclosure is separated by a predetermined distance from the second surface of the second enclosure, the predetermined distance being substantially equal to a width of a radial cooling duct of the rotor.

15. A permanent magnet unit according to claim 1, wherein the first and second enclosures are constituted by a non-magnetic material.

16. A permanent magnet unit according to claim 15, wherein the non-magnetic material is plastic.

17. A method of installing permanent magnet units into an electrical machine, said electrical machine comprising a stator and a rotor, said rotor having a shaft and said rotor being configured to rotate around the shaft, wherein the method involves at least one first permanent magnet unit and at least one second permanent magnet unit to be installed, said first permanent magnet unit comprising at least one first permanent magnet enclosed in a non-magnetic first enclosure, wherein the enclosed first permanent magnet is magnetized, wherein the first enclosure has means for connecting the first enclosure to at least one substantially similar second enclosure of the second permanent magnet unit containing at least one second permanent magnet enclosed in the second enclosure, and wherein in said method, the first permanent magnet unit is installed from the rotor end into an installation channel parallel to the rotor axis and the second permanent magnet unit is installed into the installation channel after the first permanent magnet unit in the direction of the rotor axis, and the second permanent magnet unit is pushed against the first permanent magnet unit and the permanent magnet units engage with each other using the brackets on the first and second enclosures.

18. A rotor for an electrical machine, said rotor being excited with a permanent magnet, said rotor rotating around its rotation axis and comprises at least a frame and permanent magnets, wherein at least one first permanent magnet is enclosed in a non-magnetic first enclosure of a first permanent magnet unit, and the enclosed first permanent magnet is magnetized, wherein the first enclosure has means for connecting the first enclosure to at least one substantially similar second enclosure of a second permanent magnet unit containing a second permanent magnet enclosed in the second enclosure, said first and second enclosed permanent magnets constituting a permanent magnet unit, wherein the first and second permanent magnet units are placed inside an installation channel formed inside the rotor frame one after another in the direction of the rotor axis, and the permanent magnet units are connected to each other, and wherein there are supports at the ends of the installation channel to prevent the permanent magnets from moving in the direction of the rotor axis.

19. A rotor for an electrical machine according to claim 18, wherein the pole of the electrical machine has at least two installation channels for the permanent magnet units.

20. A rotor for an electrical machine according to claim 18, wherein the rotor has at least one radial cooling duct and the distance between two interconnected permanent magnet units is substantially equal to the width of a radial cooling channel of the rotor.

* * * * *